United States Patent
Kubota et al.

(10) Patent No.: US 7,876,816 B2
(45) Date of Patent: Jan. 25, 2011

(54) MOVING PICTURE CODING PROGRAM, PROGRAM STORAGE MEDIUM, AND CODING APPARATUS

(75) Inventors: Tomonori Kubota, Kawasaki (JP); Makiko Konoshima, Kawasaki (JP); Yuichiro Teshigahara, Kawasaki (JP); Hiroyuki Masatsugu, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1386 days.

(21) Appl. No.: 11/342,969

(22) Filed: Jan. 31, 2006

(65) Prior Publication Data

US 2007/0098282 A1    May 3, 2007

(30) Foreign Application Priority Data

Oct. 31, 2005   (JP) .............................. 2005-317607

(51) Int. Cl.
    *H04N 11/02* (2006.01)
(52) U.S. Cl. .............. 375/240; 375/240.03; 375/240.12
(58) Field of Classification Search ................. 375/240, 375/240.01–240.03, 240.12, 240.24
    See application file for complete search history.

(56) References Cited

U.S. PATENT DOCUMENTS

| | | | | |
|---|---|---|---|---|
| 5,461,421 A | * | 10/1995 | Moon | 375/240.13 |
| 5,689,307 A | * | 11/1997 | Sugahara et al. | 348/419.1 |
| 6,157,675 A | | 12/2000 | Mitsuhashi et al. | |
| 6,850,214 B2 | * | 2/2005 | Nishitani et al. | 345/87 |
| 7,236,526 B1 | * | 6/2007 | Kitamura | 375/240.16 |
| 7,409,098 B2 | * | 8/2008 | Sato et al. | 382/239 |
| 2004/0096113 A1 | * | 5/2004 | Taima | 382/239 |

FOREIGN PATENT DOCUMENTS

| | | |
|---|---|---|
| JP | 8-102938 | 4/1996 |
| JP | 9-107543 A | 4/1997 |
| JP | 9-200769 | 7/1997 |
| JP | 9-214975 | 8/1997 |
| JP | 9-214977 | 8/1997 |
| JP | 10-336670 A | 12/1998 |
| JP | 11-262005 A | 9/1999 |
| JP | 2001-320703 A | 11/2001 |
| JP | 2004-15351 | 1/2004 |
| JP | 2005-304010 A | 10/2005 |

OTHER PUBLICATIONS

"Japanese Office Action" mailed by JPO and corresponding to Japanese application No. 2005-317607 on Jun. 15, 2010, with partial English translation.

* cited by examiner

*Primary Examiner*—David B Lugo
(74) *Attorney, Agent, or Firm*—Fujitsu Patent Center

(57) ABSTRACT

A moving picture coding program directs a computer to perform the procedure of detecting a scene change between images depending on, for example, whether or not summation of absolute values of inter-frame differences has exceeded a threshold, and the procedure of coding image data before a scene change by rough quantization when the scene change is detected.

10 Claims, 9 Drawing Sheets

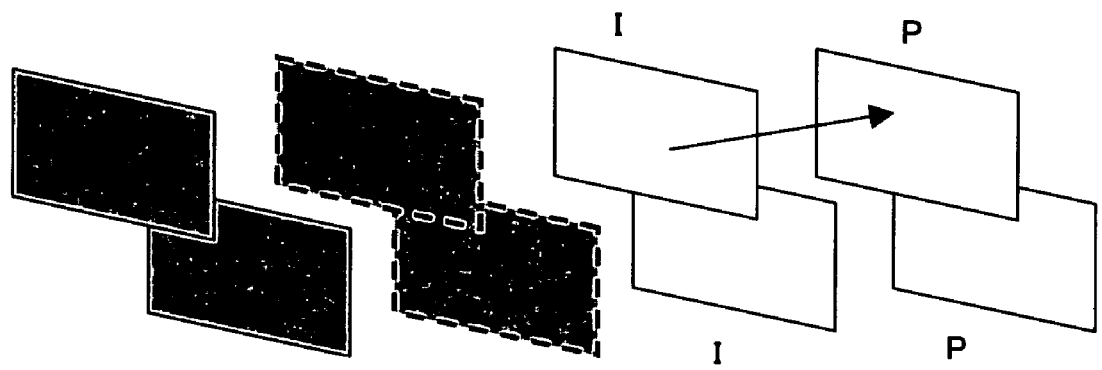
F I G. 4

MOVING PICTURE CODING PROGRAM, PROGRAM STORAGE MEDIUM, AND CODING APPARATUS

CROSS-REFERENCE TO RELATED APPLICATIONS

This application is based upon and claiming the benefit of priority from the prior Japanese Patent Application No. 2005-317607 filed in Oct. 31, 2005, the entire contents of which are incorporated herein by reference.

BACKGROUND OF THE INVENTION

1. Field of the Invention

The present invention relates to a moving picture coding system, and more specifically to a moving picture coding program, a program storage medium, and a coding apparatus for preventing picture degradation after a scene change by decreasing the amount of data used in coding an image immediately before the occurrence of the scene change which is scarcely left in the consciousness of a person when the scene change occurs between two frame images 2. Description of the Related Art Recently, various standards such as H. 261 for an ISDN moving picture transfer, H. 262 for processing a broadcast medium moving picture, H. 263 for a television telephone by an existing telephone network, MPEG-1 for an storage medium moving picture, MPEG-2 in accordance with substantially the same standard as H. 262, MPEG-4 for general-purpose multimedia for a computer, communications, a broadcast, domestic electric appliances, etc. have been set as moving picture coding systems, a moving picture is coded, and a corresponding moving picture is decoded in various fields.

With these moving pictures, there is normally a small change in image data between, for example, two frame images, and the compression coding of a moving picture can be performed by obtaining, for example, an inter-frame difference. However, when a scene change in which, for example, a portrait is changed to a landscape occurs, it is hard to efficiently apply the time difference coding, for example, an inter-frame difference coding system, and there occurs an increase in the amount of coded data, that is, the amount of generated information, to be transmitted to a decoding side, that is, the decoder side. Since the entire amount of coding of image data is predetermined, the amount of information allocated to the image data after a scene change eventually decreases when there is an increase in the amount of generated information when the scene change occurs, thereby causing the problem of picture degradation after the scene change.

Generally, relating to the visual consciousness of a person, there is a tendency that an image after a scene change remains in the consciousness of a person when the scene change occurs, and the image immediately before the scene change is hardly left in the consciousness of the person. Nevertheless, if a scene change occurs and a relatively and comparatively large amount of information is allocated to an image immediately before a scene change, the amount of generated information corresponding to the image immediately before the scene change which is visually inconspicuous is practically wasteful.

As the related art to prevent the picture degradation due to the occurrence of a scene change, the patent document 1 discloses a technology of processing some frames immediately after the scene change, in which only a part of the screen is processed in an intra-frame coding mode, and the remaining part is processed in an inter-frame coding mode with the inter-frame difference forcibly set to 0.

The patent document 2 discloses the technology of reducing the block noise. If a scene change is detected in a frame, when coding macro blocks in the frame after the detection, data correction that suppresses high frequency components included in coded output is performed, thereby the block noise is reduced.

The patent document 3 discloses a technology of preventing picture degradation. After determination of a scene change, the coding system of the first target image of the forward predictive coding is changed such that the intra-image coding can be easily performed, by changing the coding system selecting process and the selection standard depending on the determination result of a scene change.

The patent document 4 discloses the coding apparatus for performing coding by decreasing the number of bits to be allocated before a predetermined position determined based on the scene change position by the number-of-bits adjustment device, adjusting the allocation of the remaining number of bits after the predetermined position, and changing the image structure based on the scene change position by a coding device.

[Patent Document 1] Japanese Patent Application Publication No. 9-214977
  "Video Coding Method and Video Coding Apparatus"
[Patent Document 2] Japanese Patent Application Publication No. 9-200769
  "Motion Compensation Inter-frame Coding System"
[Patent Document 3] Japanese Patent Application Publication No. 9-214975
  "Scene Change Adaptive Moving Picture Coding Method and Apparatus"
[Patent Document 4] Japanese Patent Application Publication No. 2004-15351
  "Coding Apparatus, Method, Program, and Recording Medium"

Although the above listed related arts aim at preventing the picture degradation when a scene change occurs as the present invention, for example, the patent document 4 has to change the structure of an image in addition to the adjustment in number of bits, and the related arts generally require complicated control, thereby failing in providing a technology of effectively preventing picture degradation under easier control.

SUMMARY OF THE INVENTION

The present invention has been developed to solve the above-mentioned problems, and aims at preventing picture degradation by allocating a large amount of information to an image after a scene change and improving the coding efficiency after the scene change by suppressing the amount of coded data, that is, the amount of generated information, of the image immediately before the scene change if it occurs, that is, the image immediately before the scene change which is not likely to be referenced in the time difference coding.

BRIEF DESCRIPTION OF THE DRAWINGS

FIG. 4 is an explanatory view of the method (2) of the process when a scene change is detected in the interlace scan system;

DESCRIPTION OF THE PREFERRED EMBODIMENTS

The moving picture coding program according to the present invention is used to direct a computer to perform the procedure of detecting a scene change between images, and the procedure of performing coding by rough quantization on the image data before the scene change when the scene change is detected.

Figure 1:
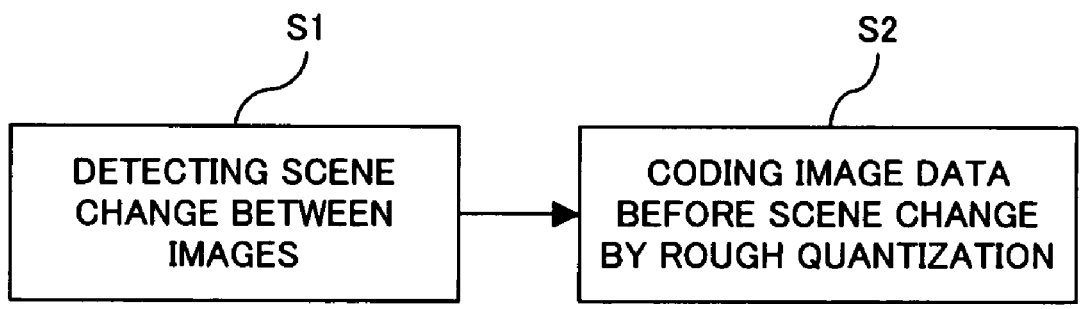
FIG. 1 is a block diagram showing the principle of the function of the moving picture coding program according to the present invention.

FIG. 1 is a block diagram showing the principle of the function of the moving picture coding program according to the present invention. The program is used to direct a computer to perform the procedure of detecting a scene change between images in step S1, and the procedure of coding the image data before a scene change by rough quantization when the scene change is detected in step S2.

Figure 2:
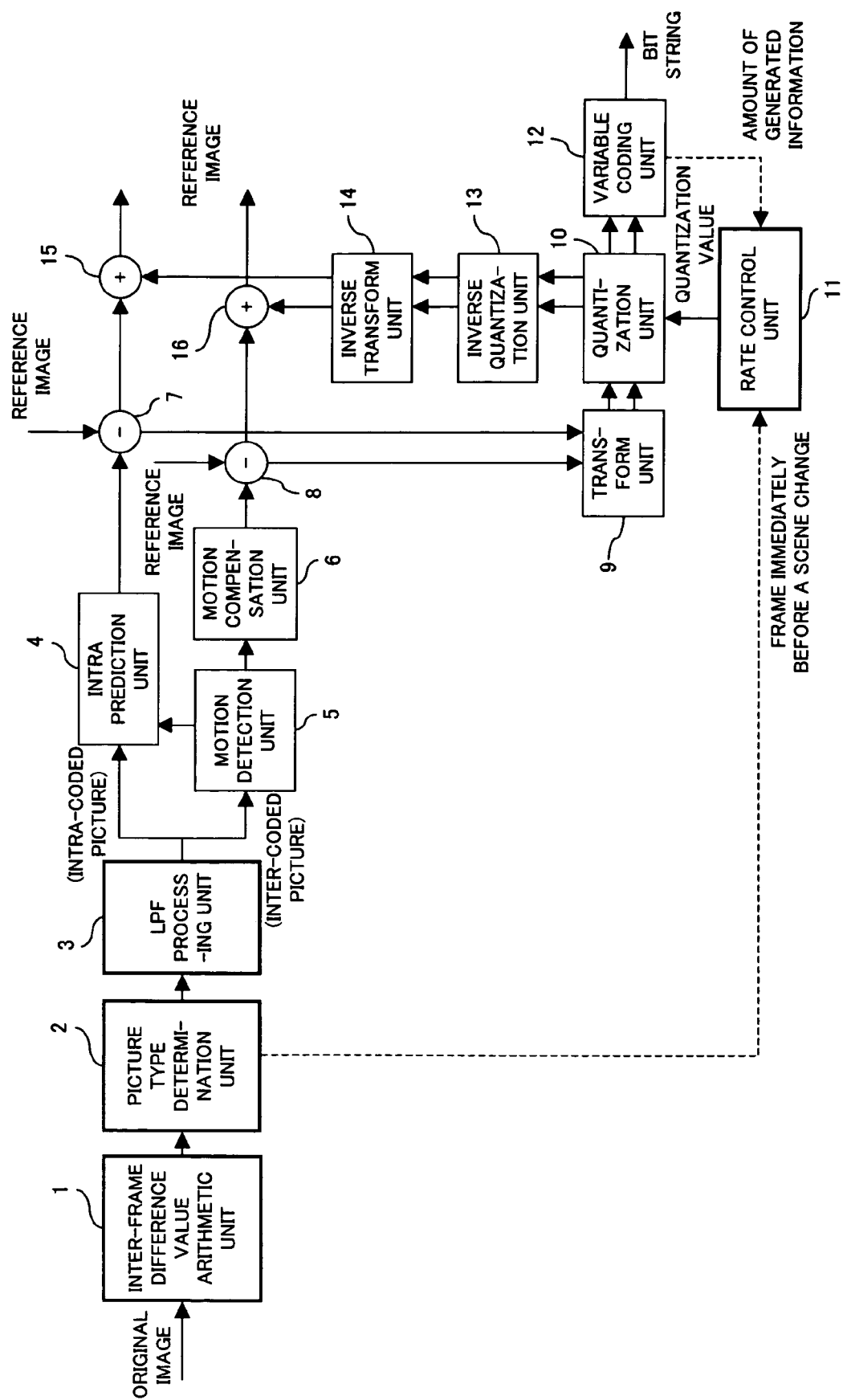
FIG. 2 is a block diagram of the configuration of the coding system in which the coding method according to the present invention is used.

FIG. 2 is a block diagram of the configuration of the image coding apparatus, that is, an encoder, in which the coding system according to the present invention is used. In FIG. 2, an inter-frame difference value arithmetic unit 1 calculates an inter-frame difference value after receiving an image of the frame immediately before a scene change and an image of the frame immediately after a scene change, and output, for example, a summation of absolute differences (SAD) together with image data to a picture type determination unit 2.

The picture type determination unit 2 determines whether or not a scene change has occurred by determining whether or not the summation of absolute differences obtained from the inter-frame difference value arithmetic unit 1 exceeds a predetermined threshold, and outputs to a rate control unit 11 the data indicating that the frame image to be coded is a frame immediately before a scene change if it is determined that a scene change has occurred. The picture type determination unit 2 determines a frame image to be coded, and determines the picture type of the frame immediately before a scene change when the scene change occurs, that is, an I picture as an intra-coded picture, a P picture as an inter-coded picture, or a B picture as an inter-coded picture.

The I (intra-coded) picture is a picture as a target of intra-frame prediction, the P picture is generated by the prediction in the forward direction in time. The B (bidirectionally predictive) picture is a target of bi-directional prediction in time.

An LPF processing unit 3 performs a low pass filtering process to remove a high frequency component such as, for example, noise, etc. on a picture whose type has been determined by the picture type determination unit 2. Then, the intra-coded picture is output to an intra prediction unit 4, and an inter-coded picture is output to the motion detection unit 5.

An intra prediction is performed by the intra prediction unit 4 basically on all macro blocks in a frame for the P picture as an intra-coded picture, but intra prediction or motion compensation is performed in a macro block unit even in one frame on the P picture and the B picture as an inter-coded pictures. It is the reason why they are output to both a motion compensation unit 6 and the intra prediction unit 4 after an inter-coded picture is input to a motion detection unit 5.

For example, the motion detection unit 5 calculates the cost for several macro blocks, in which the cost is the summation of absolute differences (SAD) between the macro block to be coded and the predicted image indicated by a motion search, and determines whether the macro block is to be output to the motion compensation unit 6 or intra prediction unit 4 depending on the calculation result.

The type of macro block, for example, in the standard H.264 can be, 16×16, 8×16, 16×8, 8×8, etc. in the number of pixels, and it basically indicates how the macro block consisting of 16×16 pixels is partitioned. In the case of the inter-frame process, it is possible to use a plurality of reference images of different times, and there can be predicted images using different reference images for some partitions in the same macro block. In the inter-coded picture, the optimum motion vector is selected from, for example, among the motion vectors in the vicinal blocks.

The output of the intra prediction unit 4 and the result of the motion compensation by the motion compensation unit 6 performed corresponding to the output of the motion detection unit 5 are provided for subtracters 7 and 8 respectively, subtracted with reference to, for example, the reference image of one frame before, and then provided for a transform unit 9. The reference image provided for the subtracter 7 corresponds to an intra-coded picture, the reference image provided for the subtracter 8 corresponds to an inter-coded picture, and they are different from each other.

The transform unit 9 performs, for example, a discrete cosine transform, etc. on the output of the subtracter 7 or 8, the transform result is quantized by a quantization unit 10, coded by a variable coding unit 12, and output as a bit string to a coded data reception side, that is, a decoder side.

At this time, the quantization value from the quantization unit 10, that is, a quantization width, or a quantizing step is provided by a rate control unit 11 for the quantization unit 10, thereby controlling a quantization value. In the present embodiment, the rate control unit 11 performs an essentially important operation, and when the picture type determination unit 2 determines that the frame image to be coded is a frame immediately before a scene change as described above, for example, the quantization unit 10 is allowed to perform rough quantization using a large quantization value so that the amount of data as a result of coding by the variable coding unit 12 can be decreased as described later.

The rate control unit 11 performs rate control using a rate control parameter as a parameter for determination of an amount of allocated information for use in coding a frame image relating to the data of an amount of information about a bit string output by the variable coding unit 12, that is, the data of the amount of generated information, and the status of a buffer, that is, the information depending on the standard, for example, the information about a VBV (video buffer verifier) buffer, etc. in case of the MPEG-2. The rate control unit 11 basically controls rate control according to the commonly and widely used rate control algorithm.

The output of the quantization unit 10 is provided for the variable coding unit 12. And it is also provided for the inverse quantization unit 13 to be inversely quantized, processed by an inverse transform unit 14 in, for example, an inverse discrete cosine transform, and added to adders 15 and 16. The adders 15 and 16 add the output of the subtracters 7 and 8 to the output of the inverse transform unit 14, and outputs, for example, a reference image to be used for the next frame. A detection unit in the moving picture coding apparatus according to the present invention corresponds to the picture type determination unit 2, and the image coding unit corresponds to the quantization unit 10, the rate control unit 11, and the variable coding unit 12.

Figure 3:
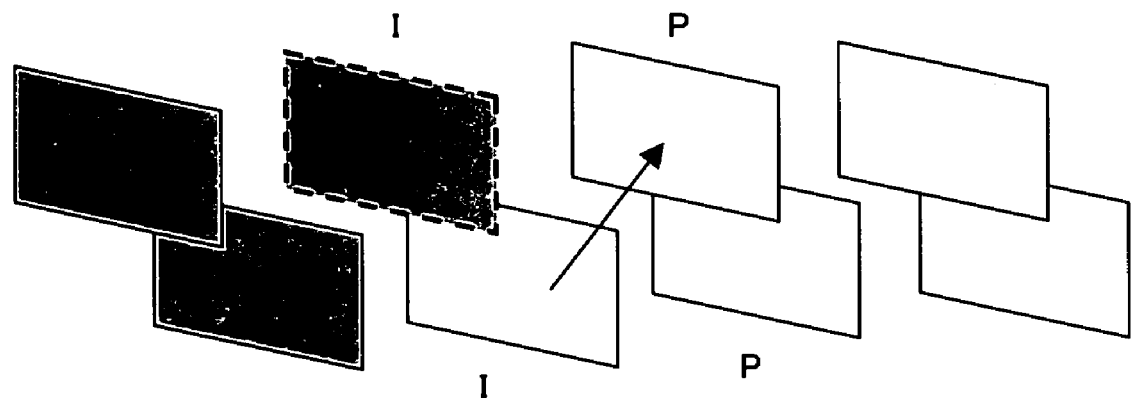
FIG. 3 is an explanatory view of the method (1) of the process when a scene change is detected in the interlace scan system.
Figure 5:
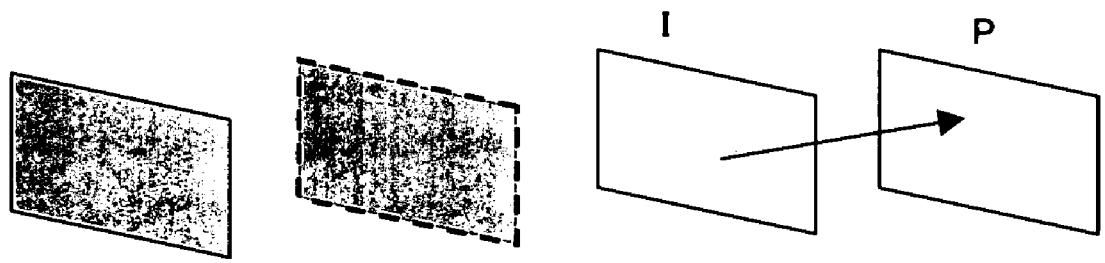
FIG. 5 is an explanatory view of the method of the process when a scene change is detected in the progressive scan system.

The detection of a scene change, a frame immediately before a scene change when the scene change is detected, or the rough quantization on a field according to the present embodiment are explained below by referring to FIGS. 3 through 5. In the embodiment of the present invention, when moving picture data is the image data of the interlace scan system, rough quantization can be used on the field image before the scene change in the coding procedure. For example, in FIG. 3, assume that a scene change has been detected among the field images in the interlace scan system. In this case, for example, coding is performed by rough quantization on the top image as a field image immediately before a scene change as described later.

FIG. 4 is an explanatory view of rough quantization, for example, for the case where a scene change has been detected in the top image in the interlace scan system, and the case where a scene change has been detected between the top image and the bottom image, but the scene change is processed in the state of a frame as a combination of the top image and the bottom image. A frame formed by the two field images of the top image and the bottom image encompassed by the dotted lines is detected as a frame immediately before a scene change, and coding is performed by rough quantization on the frame image formed by these two field images.

In the embodiment of the present invention, when the moving picture data is the image data of the progressive scan system, rough quantization can be used on the frame image before the scene change in the coding procedure. FIG. 5 is an explanatory view of rough quantization on a frame immediately before a scene change when, for example, the progressive scan system is used. In FIG. 5, it is assumed that coding is performed in a frame image unit. A frame encompassed by the dotted lines is detected as a frame immediately before a scene change, and coding is performed by rough quantization on the frame image.

Figure 6:
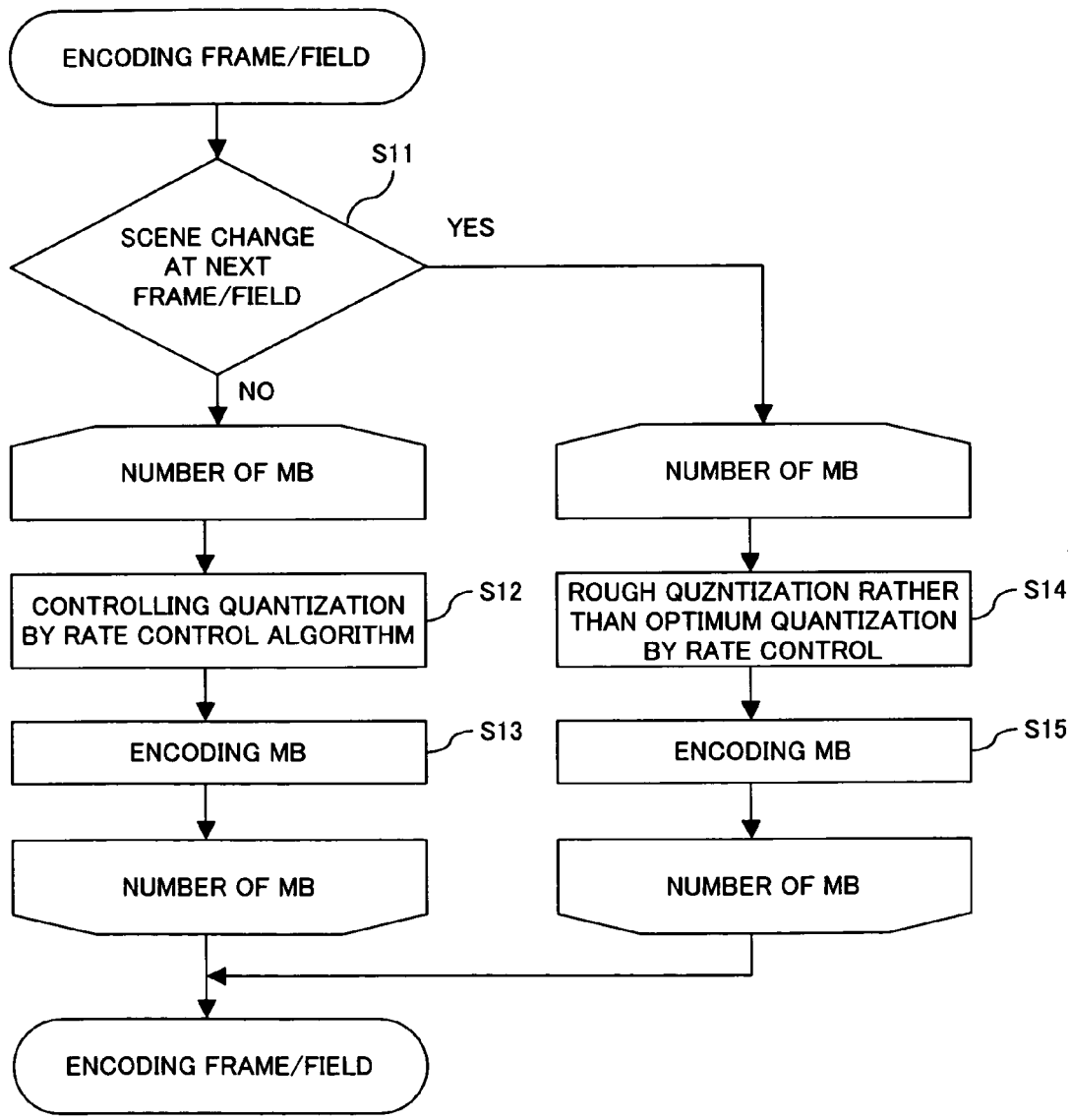
FIG. 6 is a flowchart of the coding process in the first embodiment of the present invention.

FIG. 6 is a flowchart of the process according to the first embodiment in the image data coding system. Assume that encoding, that is, coding, is performed in a frame image unit or a field image unit in FIG. 6. First, in step S11, it is determined whether or not a scene change occurs between the current frame/field image and the next frame/field image. That is, in this step, before coding the current frame or a field image, the inter-frame difference value arithmetic unit 1 shown in FIG. 2 calculates the summation of absolute differences with the next frame or the next field image in time, and the picture type determination unit 2 determines whether or not a scene change has occurred based on the calculated value.

If it is determined that a scene change has not occurred, control is performed in steps S12 and S13 with the commonly and widely used quantization rate control algorithm, and a macro block is encoded, that is, coded. The processes in steps S12 and S13 are repeated for all macro blocks in the frame or field.

If it is determined in step S11 that a scene change has occurred, the coding process is performed on all macro blocks in steps S14 and S15 in a macro block unit. In step S14, each macro block is encoded, that is, coded using a rough quantization value rather than the optimum value in the common quantization rate control. It is to allocate the largest possible amount of information to the image after a scene change in the total amount of allocated information by decreasing the amount of information allocated to the image immediately before the scene change and decreasing the amount of data of a coded bit string because when a scene change occurs, the consciousness of a person firmly holds the image after the scene change, and hardly holds the image immediately before the scene change.

The process in step S14 by rough quantization rather than the optimum value in the commonly used rate control is explained below. The systems of using a rough quantization are different depending on the case where a constant quantizing process is performed using a constant quantization value on a picture and the case where an adaptive quantizing process realized using, for example, a test model 5 (TM5) of the MPEG-2 is performed. An adaptive quantizing process is performed with a quantization value changed depending on the adaptive quantization coefficient corresponding to easiness or difficulty of coding a portion on the screen.

When a constant quantizing process is performed on a picture, a quantization value larger than an average quantization value of a plurality of pictures of the same type, for example, a plurality of I pictures is used in step S14. Depending on each standard, a quantization value 1.4 times larger, when converted into a linear quantization characteristic, than the average quantization value of pictures of the same type is used.

When adaptive quantization is performed, one of two methods is used. In the first method, a practically used quantization value as a result of adaptive quantization is not smaller than the quantization value obtained from the common rate control algorithm. That is, when a practical quantization value in the adaptive quantization is expressed as a product of an adaptive quantization coefficient and a quantization value obtained from a rate control algorithm, commonly the lower limit "a" of the adaptive quantization coefficient is defined as a value between "0" and "1", and the upper limit "b" is defined as a value exceeding "1" while the adaptive quantization coefficient is defined as a value between "1" and "b" in the present embodiment, thereby preventing the actually used quantization value from being smaller than the quantization value obtained from the common rate control algorithm.

The second method is to make the quantization value to be multiplied by an adaptive quantization coefficient, that is, the quantization value obtained from the common rate control algorithm, larger than an average quantization value for the same type of pictures. For example, as described above, the quantization value to be multiplied by the adaptive quantization coefficient is larger than an average quantization value such that the value can be 1.4 times or more when it is converted to a linear quantization characteristic.

When a rough quantization is used, for example, a parameter such as a virtual quantization buffer, etc. of a TM5, etc., to be fed back is corrected by an obtained quantization value.

Figure 7:
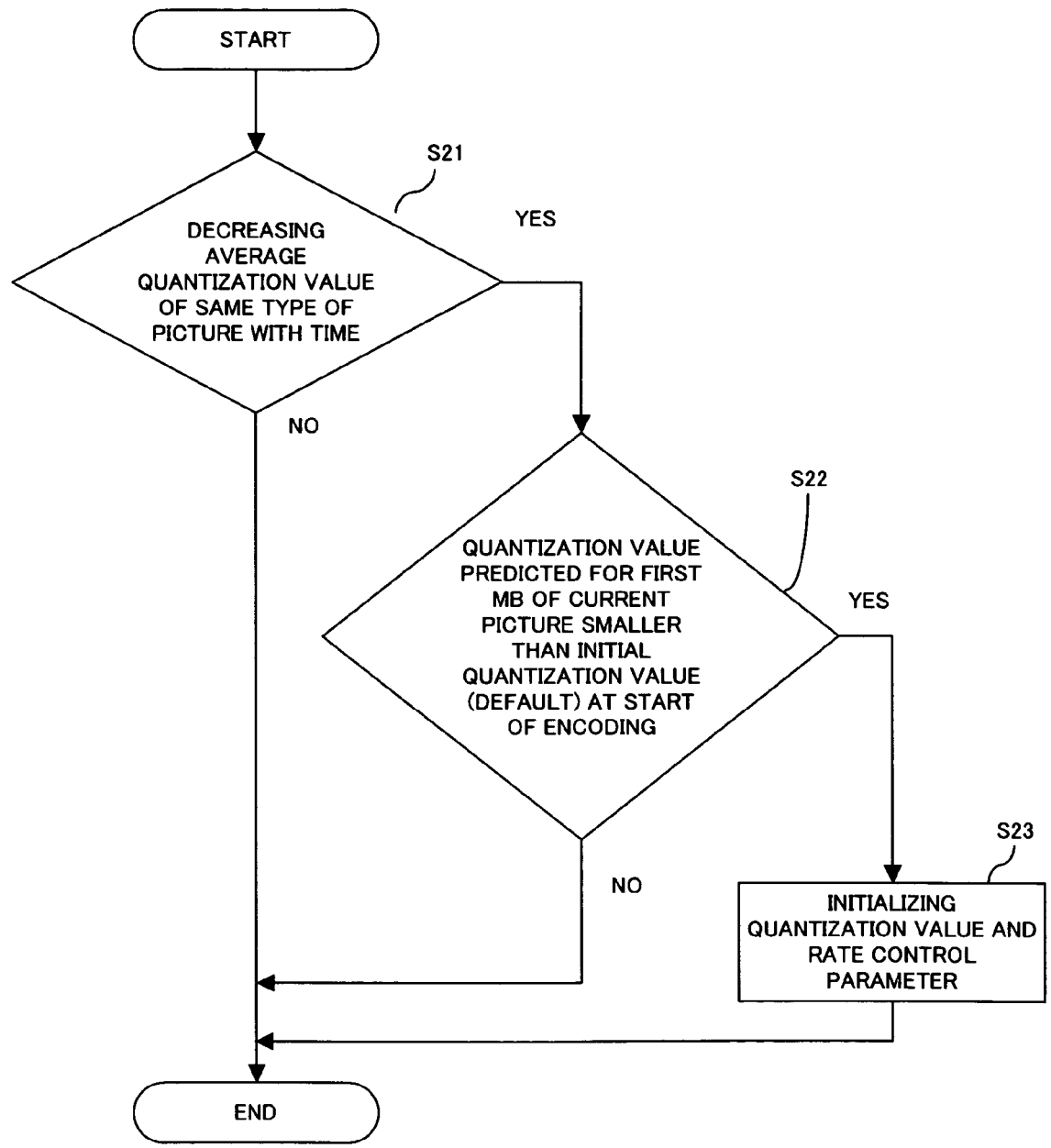
FIG. 7 is a flowchart of the additional process for the first embodiment of the present invention.

In the first embodiment shown in FIG. 6, quantization is performed by rough quantization on a frame or a field image immediately before a scene change. In addition, a rate control parameter can be initialized. FIG. 7 is a flowchart of the additional process in this case. The additional process is to be performed between steps S11 and S14.

In this additional process, it is first determined in step S21 whether or not the average quantization value of the same type of picture has been reduced with time. The determination is made depending on whether or not an average quantization value has been reduced with time corresponding to, for example, a plurality of consecutive frames or field images. If it has not been reduced, other processes are not performed, control is passed to the processes in steps S14 and S15, and coding is performed by rough quantization in a macro block unit.

If it is determined in step S21 that the average quantization value is being reduced, it is determined in step S22 whether or not the quantization value to be used on the first macro block of the current picture, that is, the image immediately before a scene change to be currently coded, has been smaller than the initial quantization value at the start of coding on image data, that is, the default. Although the average quantization value of the same type of picture is being reduced in step S21, control is returned to the processes shown in FIG. 6, and the process in steps S14 and S15 are performed in a macro block unit so far as the reduction tendency relates to some latest frames or fields of images, and the quantization value predicted for the initial macro block is not smaller than the default.

If it is determined in step S22 that the quantization value predicted for the first macro block has been reduced and is smaller than the default, then the quantization value and the rate control parameter are initialized in step S23. By the initialization of the quantization value, the quantization value when used as a rough quantization value in step S14 shown in FIG. 6 is also the default, the default is larger than the quantization value obtained by a common rate control algorithm, and coding is performed by rough quantization in steps S14 and S15 using the default.

On the other hand, the coding by rough quantization is performed in steps S14 and S15 as described above although the determination result is NO in step S21 or S22. However, the quantization value used in this process is determined in the method described above, and is commonly different from the default.

The reason for the initialization of the rate control parameter in addition to the quantization value in step S23 is that the rate control parameter commonly relates not only to the coding of the current frame or field image, but also to the coding of, for example, the next frame or field image, and it is more appropriate to initialize the rate control parameter for the image immediately before a scene change in preparation for the coding of the image data immediately after the scene change.

In the present embodiment, the low pass filtering process is strongly performed by the LPF processing unit 3 on the image data determined as a frame or a field immediately before a scene change by the picture type determination unit 2 shown in FIG. 2. As described above, since the image immediately before a scene change is hardly left in the consciousness of a person, rough quantization is used for the coding to reduce the amount of coded data for the image immediately before a scene change, the low pass filtering process is strongly performed in advance, thereby further reducing the high frequency component in the image, and eventually reducing the amount of data of the result of the coding by the variable coding unit 12. The operation of the LPF processing unit 3 is assumed to be controlled by the CPU for controlling the entire encoder corresponding to the determination result of the picture type determination unit 2.

The moving picture coding program according to the second embodiment of the present invention is used to direct a computer to perform the procedure of detecting a scene change between images, and the procedure of skipping or not coding the image before the scene change and coding only the minimal parameters required on the reception side of a coding result when the scene change is detected and the time difference coding system is used as a coding system for the image before the scene change.

In the present invention, when the time difference coding system is used as a coding system for the image data before a scene change, a computer is used to perform the procedure of stopping the coding on the image data before the scene change, and coding only the parameters required on the reception side of a coding result including the parameters indicating the stop of the coding.

Figure 8:
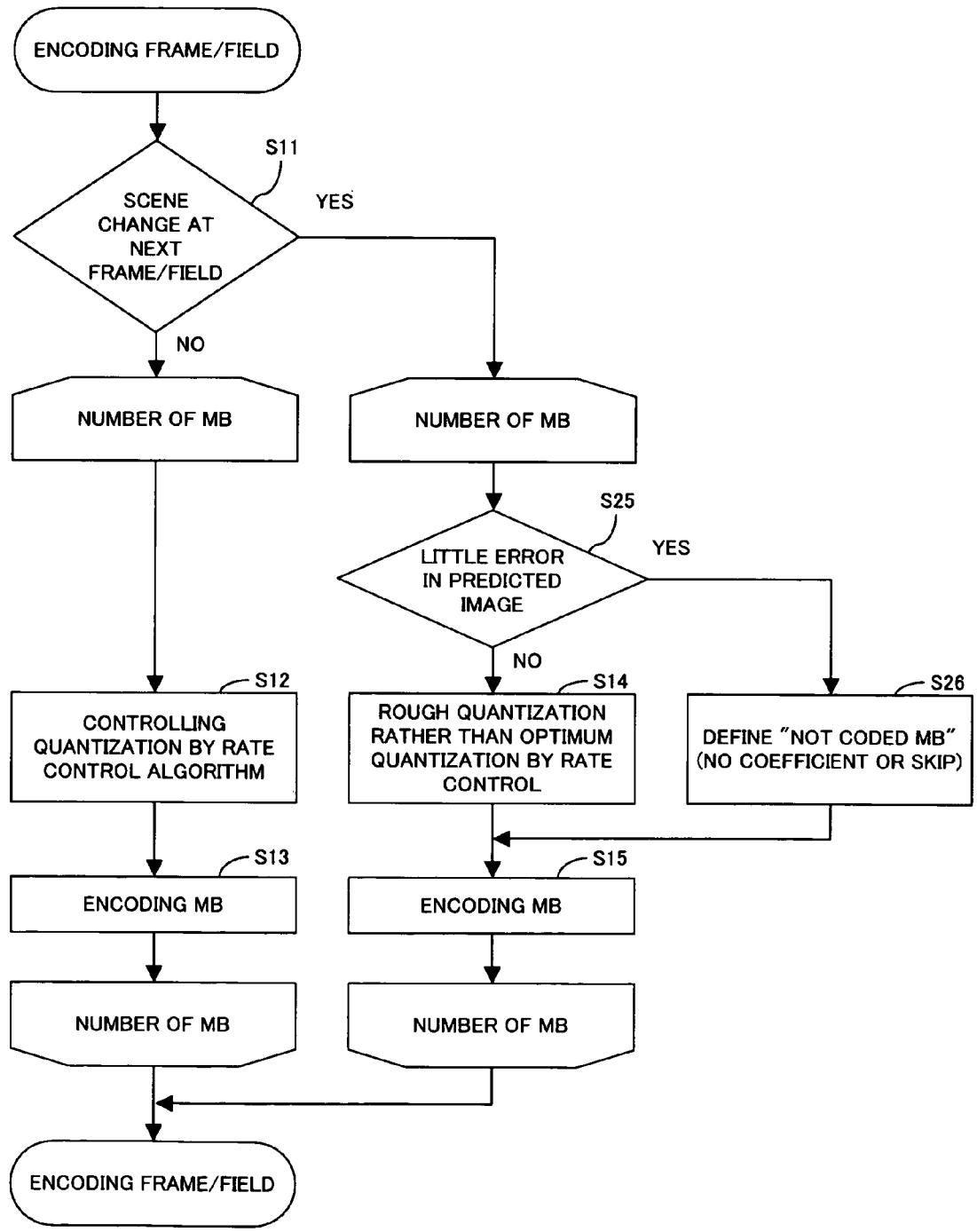
FIG. 8 is a flowchart of the coding process in the second embodiment of the present invention.

FIG. 8 is a flowchart of the process according to the second embodiment of the coding system embodying the present invention. In FIG. 8, as in the first embodiment, it is determined in step S11 whether or not a scene change has occurred with the next frame or field of the current frame or field. If it has not occurred, the quantization is controlled by the common rate control algorithm in steps S12 and S13 as in the first embodiment, and the coding of the macro block is repeated in a macro block unit.

On the other hand, if it is determined in step S11 that a scene change has occurred, then it is determined in step S25 whether or not there is a small amount of prediction error (error in a predicted image) in a macro block unit. In the determination on the prediction error, it is basically determined whether or not the prediction error with a reference image by the operation of the motion detection unit 5 and the motion compensation unit 6 on the inter-coded picture, that is, the output of the subtracter 8, is small. For example, the determination is performed only on the inter-frame difference system. If it is determined that there is not little prediction error, the processes in steps S14 and 15 are performed as in the first embodiment on the current image to be coded, that is, the image immediately before the a scene change, and coding is performed in a macro block unit by rough quantization.

If it is determined in step S25 that there is little prediction error, the macro block is processed as "not coded macro block" or "skipped macro block" in step S26, and the coding is performed with the smallest possible amount of information according to the coding information about other macro blocks. This can be realized by using the image data further immediately before the image immediately before a scene change on the reception side of the coded data because there is little prediction error on the image immediately before the scene change. Therefore, the coding is not performed on the image in a macro block containing little prediction error, the variable coding unit 12 codes a parameter indicating that the image data immediately before the data is to be used on the reception side of the data, that is, on the decoder side, and the coded data is transmitted to the data reception side.

Also in the second embodiment shown in FIG. 8, as explained in the first embodiment, it is possible to add the processes shown in FIG. 7 between steps S11 and S25. Therefore, for example, when the quantization value and the rate control parameter are initialized in step S23, the coding is performed using a default quantization value in steps S14 and S15.

In the second embodiment, by strongly performing the low pass filtering process by the LPF processing unit 3 on the image immediately before the scene change to be coded as described above, the amount of coded data of the image immediately before the scene change can be further reduced.

According to the present invention, a computer-readable portable storage medium recording a moving picture coding program like an above-mentioned program can be used, and a moving picture coding apparatus operating corresponding to the program can also be used.

Figure 9:
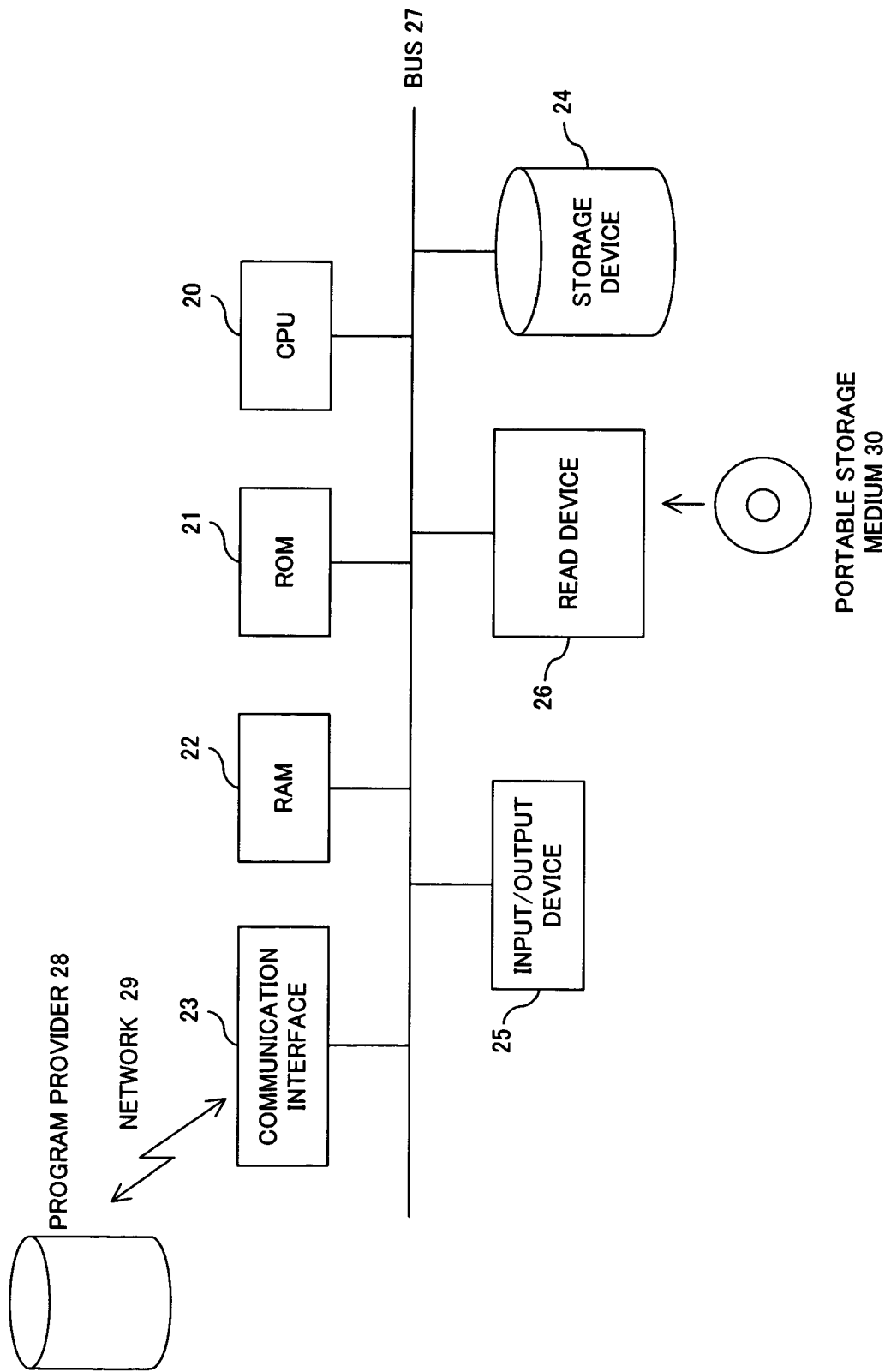
FIG. 9 is an explanatory view of loading a program into a computer according to the present invention.

The moving picture coding program and the moving picture coding apparatus according to the present invention have been described above in detail, but the program can be used by the coding system based on the common computer system. FIG. 9 is a block diagram of the configuration of such a computer system, that is, the hardware environment.

In FIG. 9, the computer system comprises a central processing unit (CPU) 20, read only memory (ROM) 21, random access memory (RAM) 22, a communication interface 23, a storage device 24, an input/output device 25, a read device 26 of a portable storage medium, and a bus 27 for connection of all of the components.

The storage device 24 can be any of the various types of storage devices such as a hard disk, a magnetic disk, etc. The storage device 24 or the ROM 21 stores a program (for example, a program shown in the flowchart in FIGS. 6 through 8) according to the present invention, etc. By the CPU 20 executing the program, the coding by rough quantization can be performed on the image immediately before a scene change according to the present embodiment.

The program can be stored in, for example, the storage device 24 from a program provider 28 through a network 29 and the communication interface 23, or can be marketed and stored in a distributed portable storage medium 30, set in the read device 26, and can be executed by the CPU 20. The portable storage medium 30 can be any of various storage media such as CD-ROM, a flexible disk, an optical disk, a magneto optical disk, DVD, etc. By the read device 26 reading the program stored in these storage media, the picture degradation after a scene change can be prevented according to the present embodiment.

According to the present invention, for example, when a scene change is detected between two frame images, for example, the amount of data of the coded data for the image immediately before the scene change can be decreased by performing coding by rough quantization on the image data immediately before the scene change.

According to the present invention, a relatively large amount of information can be allocated to an image after a scene change by reducing the amount of generated information corresponding to the image immediately before the scene change which is visually inconspicuous, thereby greatly contributing to the improvement of the quality of pictures after the scene change. When a scene change occurs, the image immediately before the scene change is not likely to be referenced in the time difference coding system, and the coding efficiency can be improved on the image after the scene change by forcibly coding the minimal parameters on the image for example by excluding coefficient information, etc.

What is claimed is:

1. A non-transitory computer-readable portable storage medium storing a program used to direct a computer for coding a moving picture to perform a process, the process comprising:
   detecting a scene change between images;
   initializing a quantization value to be used for quantizing an image before the scene change, the initializing being performed substantially when the scene change is detected; and
   coding the image before the scene change by rough quantization when the scene change is detected, wherein
   the rough quantization uses a first value that is greater than or equal to a second value to be used as the quantization value for the image before the scene change when the scene change is not detected.

2. The storage medium according to claim 1, wherein when the moving picture is an image in an interlace scan system,
   a field image before the scene change is coded by the rough quantization in the coding.

3. The storage medium according to claim 1, wherein when the moving picture is an image in a progressive scan system,
   a frame image before the scene change is coded by the rough quantization in the coding.

4. The storage medium according to claim 1, wherein when the moving picture is an image in an interlace scan system,
   a frame image before the scene change is coded by the rough quantization in the coding.

5. The storage medium according to claim 1, wherein the initializing includes further initializing a rate control parameter.

6. The storage medium according to claim 1, wherein the process further comprises reducing a high frequency component in the image before the scene change by performing a low pass filtering process to the image before the scene change, and
   the low pass filtering process is performed prior to coding the image before the scene change.

7. The storage medium according to claim 1, wherein when an average value of the quantization value of a same type of picture has been reduced with time and a value of the quantization value predicted for a first macro block in the image before the scene change is smaller than a default value of the quantization value, the initializing is performed and leads to the default value being used as the first value.

8. A non-transitory computer-readable portable storage medium storing a program used to direct a computer for coding a moving picture to perform a process, the process comprising:
   detecting a scene change between images;
   initializing a quantization value to be used for quantizing an image before the scene change, the initializing being performed substantially when the scene change is detected; and
   coding the image before the scene change by rough quantization, or defining the image before the scene change to be skipped or not to be coded, followed by coding parameters required on a reception side of a coding result, the coding by the rough quantization or the defining followed by the coding being performed when the scene change is detected and a time difference coding system is used as a coding system on the image before the scene change, wherein
   the rough quantization uses a first value that is greater than or equal to a second value to be used as the quantization value for the image before the scene change when the scene change is not detected.

9. The storage medium according to claim 8, wherein the process further comprises determining whether to perform the coding by the rough quantization or to perform the defining followed by the coding, and
   the determining depends on a prediction error.

10. A moving picture coding apparatus which codes a moving picture, comprising:
   a detection unit detecting a scene change between images;
   an initialization unit initializing a quantization value to be used for quantizing an image before the scene change, initialization by the initialization unit being performed substantially when the scene change is detected; and
   an image coding unit coding the image before the scene change by rough quantization when the scene change is detected, wherein
   the rough quantization uses a first value that is greater than or equal to a second value to be used as the quantization value for the image before the scene change when the scene change is not detected.

* * * * *